United States Patent [19]

Prochazka et al.

[11] 4,418,025
[45] Nov. 29, 1983

[54] PROCESS FOR PRODUCING OPTICALLY TRANSLUCENT MULLITE CERAMIC

[75] Inventors: Svante Prochazka, Ballston; Frederic J. Klug, Amsterdam, both of N.Y.

[73] Assignee: General Electric Company, Schenectady, N.Y.

[21] Appl. No.: 381,821

[22] Filed: May 25, 1982

[51] Int. Cl.³ .................. B29D 11/00; C04B 35/18
[52] U.S. Cl. ................................. 264/1.2; 264/63; 264/65; 423/327; 501/12; 501/128; 501/153; 501/154
[58] Field of Search .............. 501/12, 128, 153, 154; 423/327; 264/1.2, 65, 325, 332, 63

[56] References Cited

U.S. PATENT DOCUMENTS

| | | | |
|---|---|---|---|
| 3,989,783 | 11/1976 | McGee et al. | 264/56 |
| 4,101,615 | 7/1978 | Horikiri et al. | 264/65 |
| 4,266,978 | 5/1981 | Prochazak | 264/1.1 |

OTHER PUBLICATIONS

"Advanced Optical Ceramics, Phase II", Book 1 of 2, ONR Contract No. N00014-78-C-0466 (DIN: 80SDR2172), General Electric Co., pp. 1–14 and 21–42, (Aug. 31, 1980).

"Program Review – Advanced Optical Ceramics – Phase II, Government/Industry Briefing", ONR Contract No. N00014-78-C-0466, DARPA Order No. 3387, General Electric Company, p. C–9, (May 8–9, 1980).

K. S. Mazdiyansi & L. M. Brown, "Synthesis and Mechanical Properties of Stoichiometric Aluminum Silicate (Mullite)", vol. 55, No. 11, pp. 548–552, (Nov. 1972).

B. E. Yoldas, "Microstructure of Monolithic Materials Formed by Heat Treatment of Chemically Polymerized Precursors in the $Al_2O_3$–$SiO_2$ Binary, vol. 59, No. 4, pp. 479–483, (1980).

Primary Examiner—Helen M. McCarthy
Attorney, Agent, or Firm—Jane M. Binkowski; James C. Davis, Jr.; James Magee, Jr.

[57] ABSTRACT

Amorphous mixed oxide powder composed of from about 74 weight % to about 76.5 weight % $Al_2O_3$ balance $SiO_2$ is pressed into a compact with a density of at least 1 g/cc and sintered in oxygen producing an optically translucent theoretically dense body of mullite.

5 Claims, 4 Drawing Figures

PROCESS FOR PRODUCING OPTICALLY TRANSLUCENT MULLITE CERAMIC

The Government has rights in this invention pursuant to Contract N00014-80-C-0964 awarded by the Department of the Navy.

This invention relates to sintering of compacted amorphous aluminum silicate compositions that transform to mullite in an advanced stage of densification and continue to densify thereafter into a translucent theoretically dense ceramic.

Mullite, a crystalline aluminum silicate phase of composition $3Al_2O_3.2SiO_2$ or close to $3Al_2O_3.2SiO_2$, is a common mineral constituting silicate ceramics (whiteware, fire clay, etc.). Recent phase diagrams report 71.5 to 74 weight % $Al_2O_3$ as the compositional band for mullite crystallized in the solid state.

Mullite has been studied extensively, however its pore free, translucent polycrystalline forms were reported only by Mazdyiasni and Brown (1972) and Yoldas (1978). Specifically, Mazdiyasni and Brown, "Synthesis and Mechanical Properties of Stoichiometric Aluminum Silicate (Mullite)", Journal of the American Ceramic Society, Vol. 55, No. 11, pages 548–552 (Nov. 1972) disclose alkoxy-derived submicron aluminum silicate ($3Al_2O_3.2SiO_2$), specifically 71.8 wt % $Al_2O_3$/28.2 wt % $SiO_2$, with acicular, needlelike morphology can be vacuum-hot-pressed into highly dense, translucent polycrystalline bodies of stoichiometric mullite, and that the resulting compacts had a fine-grained microstructure consisting of needlelike interlocking grains arranged in an overall "jigsaw" pattern.

Yoldas, "Microstructure of Monolithic Materials Formed by Heat Treatment of Chemically Polymerized Precursors in the $Al_2O_3$-$SiO_2$ Binary", Ceramic Bulletin, Vol. 59, No. 4, pages 479–483 (1980) discloses that transparent gel materials were prepared in the $Al_2O_3$-$SiO_2$ binary at low temperatures by a technique that allows polymerization of aluminum and silicon through oxygen bridges at room temperature, specifically by reacting an aluminum hydrosol with silicon tetraethoxide, and that when these gel materials were heated, he observed that the composition 63 wt% $Al_2O_3$-37% $SiO_2$ had a unique capacity to remain transparent at high temperatures, i.e., 1400° C., where other materials turned opaque.

No reports are known of translucent theoretically dense polycrystalline mullite prepared by a sintering process.

In pure form mullite would be interesting as an optical material for its low thermal expansion, high melting point, chemical stability and absence of absorption bands in the visible spectrum.

According to the present invention, an optically translucent polycrystalline mullite ceramic is produced by pressing a mixed oxide powder with certain characteristics into a compact with a minimum density of 1.0 gram/cc and sintering the compact in an atmosphere of oxygen.

Briefly stated, the present polycrystalline mullite product is produced by a process comprising providing an amorphous shapeless mixed oxide powder comprised of from about 74 weight % to about 76.5 weight % $Al_2O_3$ balance $SiO_2$ which contains no significant amount of contaminants, said powder being pressable at about room temperature into a compact having a minimum density of 1.0 g/cc, pressing said powder into a compact having a minimum density of 1.0 g/cc, and sintering said compact in an atmosphere of oxygen at a temperature ranging from about 1700° C. to about 1850° C. producing an optically translucent sintered body of theoretical density based on the density of 3.16 g/cc±0.01 or 3.17 g/cc±0.01 for said mullite product.

By a shapeless powder it is meant herein a powder with no regular or distinguishing shape or form on a microscopic scale. By a fluffy powder it is meant herein a powder which is like fluff, i.e. it is loose and soft. The present powder is characterized by a low bulk density which ranges from about 0.2 g/cc to about 0.3 g/cc at about room temperature. By room temperature it is meant herein 25° C.

The sintered product of the present invention is an optically translucent polycrystalline body of mullite composed of from about 74 weight % to about 76.5 weight % of $Al_2O_3$ balance $SiO_2$. Its microstructure depends on its composition and on sintering temperature.

By an optically translucent polycrystalline sintered body it is meant herein a body through which light or radiation in the visible wave length is able to pass through sufficiently to make such body useful for optical applications such as enclosures for arc tubes.

Those skilled in the art will gain a further and better understanding of the present invention from the detailed description set forth below, considered in conjunction with the figures accompanying and forming a part of the specification, in which.

Figure 1:
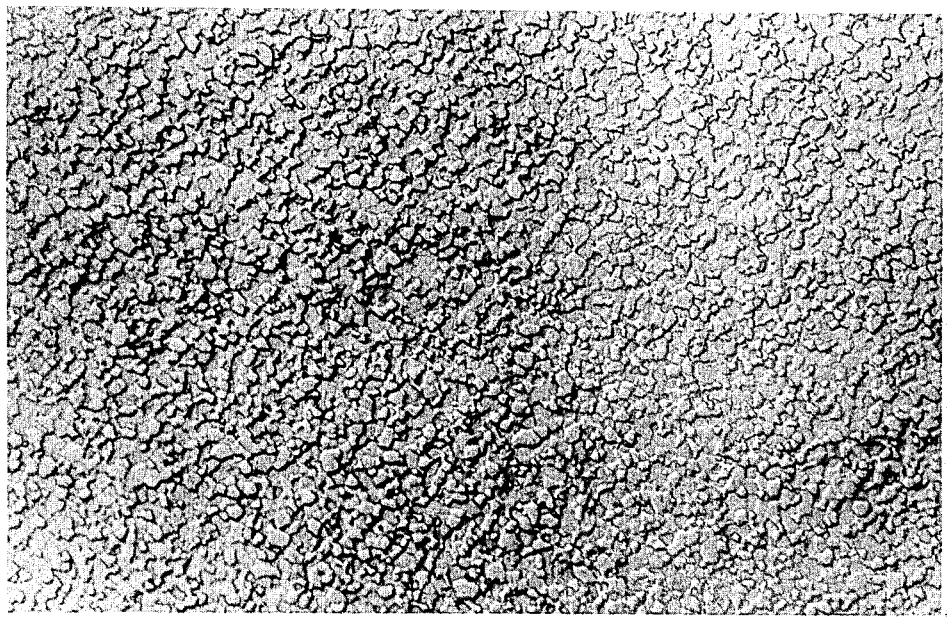
FIG. 1 is a photomicrograph (magnified 300×) showing the polished and etched section of an optically translucent disc 75 wt % $Al_2O_3$/25 wt % $SiO_2$ produced in accordance with the present invention.

The present starting mixed oxide powder is prepared from a homogeneous gel composed of hydrolyzed precursors of $Al_2O_3$ and $SiO_2$. The precursors can be organic or inorganic and are used in amounts which produce the present mixed oxide composition, i.e. the present aluminosilicate composition. This gel is produced, i.e. precipitated, in a known manner through hydrolysis of a solution or organic or inorganic precursors for $Al_2O_3$ and $SiO_2$. Depending largely on the starting materials, a peptizing agent such as nitric acid may be added to the solution to promote conversion to a gel.

For example the gel can be prepared by hydrolysis of alkyloxides of silicon and aluminum. For example, the gel can be produced by dissolving aluminum isopropoxide and ethylmetasilicate in cyclohexane, and hydrolysis of the solution carried out by an addition of the theoretical amount of water (required to completely hydrolyze the alkyloxides) preferably dissolved in tertiary butyl alcohol to prevent separation of water into another phase during hydrolization. The water should be thoroughly admixed with the solution, preferably at about room temperature, to obtain substantially complete hydrolysis.

In a preferred technique, aluminum monohydrate is dispersed in water with a pH adjusted by nitric acid or other acid to a pH of about 4 by intensive agitation to obtain a colloidal dispersion. It is preferred but not essential that the colloidal dispersion be separated from the non-dispersible residue by screening through fine sieves or by centrifugation. The resulting colloidal dispersion of monohydrate is analyzed for its total $Al_2O_3$ content, and then mixed, for example, with ethylsilicate, in a ratio which produces the present ratio of 74 weight % to 76.5 weight % $Al_2O_3$ balance $SiO_2$. The mixture should be stirred, preferably at about room temperature, to complete hydrolysis producing the present gel product.

The present gel can be organic or inorganic and it always contains water. Preferably, if possible, the gel is thickened by filtration before it is dried to produce the present amorphous fluffy powder.

The present gel must be dried in a manner which produces the present starting amorphous fluffy powder. Specifically, drying of the gel must be carried out to remove water therefrom without collapsing it into dense particles. The present gel cannot be dried by removing its water content in liquid form since such removal collapses the gel into dense particles. Therefore, simple evaporation at room temperature or elevated temperatures cannot be applied as it results in shrinkage and formation of a strong particulate substance.

The gel can be freeze dried to produce the present starting powder. Generally, this comprises freezing the gel and subliming off its water content under vacuum. Freeze drying is not applicable to gels containing alcohols with low freezing points as these alcohols suppress the freezing point.

Alternatively, the gel can be dried by replacing its water content with a non-aqueous solvent producing a non-aqueous gel which can be dried in several ways to produce the present starting powder. Specifically, this is an exchange of solvents procedure and is applicable if the gel can be filtered. The filtered gel is then diluted with methanol, filtered, and the resulting gel further washed with methanol to displace all water and finally methanol is washed away with acetone. The resulting non-aqueous gel can be dried in air at room temperature to produce the present starting powder.

Alternatively, the gel can be dried by removal of the water under supercritical conditions to produce the present powder. This can be carried out by transferring the gel into an autoclave and heating it above the critical point of water, which is above 374° C. at a pressure of 3184 psi. At this temperature the water disappears and vapor is slowly vented from the autoclave. The product is the present powder or a very friable lumpy material which is easily broken down to the present powder.

The starting aluminum silicate powder is an amorphous powder of finely dispersed oxides composed of from about 74 weight % to about 76.5 weight % $Al_2O_3$ balance $SiO_2$. Depending largely on its specific method of preparation, it contains a significant amount of water and usually, a significant amount of organic material. This powder is white, fluffy, free-flowing and shapeless with a surface area, according to low temperature nitrogen adsorption techniques, ranging from about 100 square meters per gram to about 400 square meters per gram, and preferably from about 200 square meters per gram to about 300 square meters per gram. This powder also has a low bulk density which ranges from about 0.2 g/cc to about 0.3 g/cc at about room temperature. No water should be added to this powder since the addition of water to it would shrink and collapse it into dense particles on subsequent drying.

The starting powder is calcined at atmospheric pressure at a temperature ranging from about 490° C. to about 1100° C., preferably from about 500° C. to 700° C., to remove water and organic material therefrom leaving no significant amount thereof. A calcining temperature below 490° C. may not remove its organic content. A calcining temperature above about 900° C. tends to aggregate the powder lightly but such calcined powder can be dry milled to break down the aggregates and dry screened without affecting its morphology significantly. Temperatures above about 1100° C. are not useful since they cause significant formation of hard aggregates. Clacining time is determinable empirically, for example, by weight loss. Calcining is completed when there is no more weight loss on further firing. Because heat transmission in this powder is very low, firing time can be as long as 10 hours. This calcining has no significant deleterious effect on the powder or its $Al_2O_3/SiO_2$ composition. Specifically, this calcining does not affect the oxide composition or morphology of the powder in any significant manner.

The calcined powder is amorphous, shapeless, fluffy and free-flowing and contains no significant amount of contaminants. It is a finely dispersed mixed oxide composed of from about 74 weight % to about 76.5 weight % $Al_2O_3$ balance $SiO_2$. It has a surface area, according to low temperature nitrogen adsorption techniques, ranging from about 100 square meters per gram to about 400 square meters per gram, and preferably from about 200 square meters per gram to about 300 square meters per gram. This powder also has a low bulk density which ranges from about 0.2 g/cc to about 0.3 g/cc at about room temperature. The calcined powder must be pressable at or about room temperature, i.e. about 25° C., into a compact with a minimum density of 1 gram/cc. No water should be added to the calcined powder since the addition of water to it would shrink and collapse it into dense particles on subsequent drying. In the present invention, a mixed oxide powder outside the present composition does not produce the present optically translucent body.

The calcined powder is pressed to produce a compact, i.e. a green compact, having a density of at least 1.0 gram/cc, and preferably higher than about 1.0 gram/cc to as high as possible, which usually is about 1.6 gram/cc at about room or ambient temperature. A compact with a density lower than 1.0 gram/cc will not produce the present optically translucent product. A minimum applied pressure of about 10,000 psi may produce the present pressed compact, but typically the applied pressure is at least about 30,000 psi. The applied pressure can range to as high as possible which usually is about 100,000 psi. No additives or additions should be made to the powder. The powder preferably is pressed at about room or ambient temperature. There is no advantage in using a temperature other than about room temperature.

The calcined powder is pressed into a compact by means which have no significant deleterious effect thereon. Specifically, the pressing means should not contaminate the powder. The powder can be die-pressed or isostatically pressed. Preferably, a steel die is used in die-pressing.

The compact can vary widely in form and size. It can be of simple, hollow or of geometrically complex shape. The present pressed compact having a density of at least 1.0 gram/cc has sufficient strength for handling purposes. For example, the present pressed compact in the form of a hollow tube having a wall thickness of 20 mils was sufficiently strong for handling purposes.

If desired, the compact may be prefired, for example, to impart additional strength to it allowing it to be more easily machined. If such prefiring is carried out at a temperature at which the pores of the compact remain open, and ordinarily closure of the pores in the compact is initiated at about 1500° C., then this prefiring to add strength to the compact can be carried out at atmospheric pressure in air, argon, helium, nitrogen, oxygen and mixtures thereof, as well as a partial vacuum provided such partial vacuum does not significantly vaporize the $SiO_2$ component of the compact. Generally, prefiring temperature ranges up to about 1650° C. The particular firing temperature and firing time are determinable empirically and should have no significant deleterious effect on the compact. For example, a vacuum higher than about 0.05 torr may vaporize the $SiO_2$ component of the compact.

Usually, the prefiring temperature ranges from about 1100° C. to about 1650° C. If the selected prefiring temperature is above about 1500° C., where pores of the compact are being disconnected from its surface, the furnace atmosphere has to be pure oxygen or a vacuum ranging from about 0.05 torr to about 1 torr. Other gases, such as nitrogen, argon or carbon dioxides, when present in the prefiring atmosphere during pore closure in the compact, would be entrapped in the pores and would inhibit pore removal during sintering. Only oxygen is transported through crystalline mullite at a high enough rate not to interfere with the present sintering process, and therefore, only an oxygen furnace atmosphere can be applied when firing through the interval of pore closure. Similarly, a vacuum lower than about 1.0 torr, i.e. where the pressure of the atmosphere is greater than about 1 torr, if gases other than oxygen are present, may introduce significant amounts of these gases into the pores and adversely limit the translucency of the sintered product. A prefiring temperature higher than about 1650° C. in a vacuum ranging from about 0.05 torr to about 1.0 torr would vaporize $SiO_2$ from the compact.

The compact is sintered in an atmosphere of oxygen. In the present process, the sintering atmosphere of oxygen gas is a flowing atmosphere and need only be sufficiently flowing to remove gaseous products which may be present, normally as a result of contaminants. Generally, the particular flow rate of oxygen gas depends on the size of the furnace loading and somewhat on sintering temperature. The sintering atmosphere is preferably at atmospheric or about atmospheric pressure.

The present sintering temperature ranges from about 1700° C. to about 1850° C. and depends to some extent on the $Al_2O_3$ content of the body and should not have a significantly deleterious effect thereon. Specifically, for a body containing 74 weight % $Al_2O_3$, sintering temperatures significantly higher than about 1800° C. may form 1% or higher volume fraction of glass phase. Formation of glass phase decreases with increasing $Al_2O_3$ content, and temperatures up to about 1850° C. have no significant deleterious effect on bodies containing from about 74.5 to about 76.5 weight % $Al_2O_3$. Sintering temperatures lower than about 1700° C. do not produce the present optically translucent body. On the other hand, temperatures higher than 1850° C. produce an optically translucent body with grains that are too large thereby rendering it with poor strength. Also, temperatures above 1850° C. bring about reduction of transmission as a result of the formation of a glass phase. Moreover such temperatures are close to the melting point of mullite.

The rate of heating to sintering temperature depends to a large extent on the extent of any impurities in the compact. The rate of heating should be such so as to eliminate any impurities from the compact before it reaches a temperature which locks these impurities in. Generally, the compact is heated to sintering temperature at rates which range up to about 300° C. per hour. Higher heating rates may produce bloating of the body due to volatiles which did not escape earlier.

The particular sintering time period depends largely on the sintering temperature and is determinable empirically with increasing sintering temperature requiring less sintering time. For example, however, a sintering temperature of about 1800° C. may have a sintering time period ranging from about 1 hour to about 10 hours.

In the present process, there is no significant loss of $Al_2O_3$ or $SiO_2$.

The present optically translucent body is comprised of an aluminosilicate composed of from about 74% by weight to about 76.5% by weight $Al_2O_3$/balance $SiO_2$. Its composition is determinable by a number of techniques including wet chemical analysis, X-ray fluorescent analysis, mass spectroscopy and electron beam microanalyses.

The microstructure of the present optically translucent polycrystalline sintered body may vary somewhat depending on its composition and on sintering temperature. In the present sintering temperature range of about 1700° C. to about 1850° C. and a composition composed of about 74.5 weight % to about 76.5 weight % $Al_2O_3$/balance $SiO_2$, as well as in the sintering temperature range of about 1700° C. up to about 1800° C. and a composition of about 74 weight % to about 74.5 weight % $Al_2O_3$/balance $SiO_2$, the present optically translucent body has a uniform or substantially uniform microstructure comprised of equiaxed or substantially equiaxed grains with an average grain size ranging from about 8 microns to about 50 microns. An average grain size less than about 8 microns usually renders the sintered body with poor optical properties. On the other hand, an average grain size higher than about 50 microns renders the sintered body with poor strength largely due to microcracking. Preferably, for best optical translucency and strength, the present sintered body has an average grain size ranging from about 12 microns to about 35 microns. The grain size of the present optically translucent product depends largely on sintering temperature and sintering time. The higher the sintering temperature and the longer the sintering time, the larger is the average grain size of the product.

However, the microstructure of the present optically translucent polycrystalline sintered body varies when it is produced in the sintering temperature range from about 1800° C. to about 1850° C. from a compact composed of about 74 weight % up to about 74.5 weight % $Al_2O_3$/balance $SiO_2$. Specifically, with a content of 74 weight % $Al_2O_3$, the resulting optically translucent body produced at from about 1800° C. to about 1850° C. will have, or is likely to have, a microstructure composed of elongated grains. As the $Al_2O_3$ content is increased from 74 weight % in this 74 weight % up to about 74.5 weight % Al$_2$O$_3$ range, the microstructure of the optically translucent body produced at this higher sintering temperature range also will show substantially equiaxed or equiaxed grains, and its microstructure will be composed of a combination of elongated and equiaxed or substantially equiaxed grains. With a further increase in Al$_2$O$_3$ content, i.e. approaching 74.5 weight %, the resulting optically translucent sintered body will have or likely will have a microstructure which is uniform or substantially uniform composed of equiaxed or substantially equiaxed grains.

The present optically translucent body ranges from one comprised of single phase to one comprised of a primary phase and secondary phase, said secondary phase ranging up to about but less than 1% by volume of the total volume of the sintered body. Such phase composition of the optically translucent body is determinable by optical microscopy. By the term single phase or primary phase it is meant herein the mullite phase. The mullite phase also is identifiable by X-ray diffraction analyses. The secondary phase should have no significant deleterious effect on the present product. The secondary phase may be Al$_2$O$_3$ or glass.

Ordinarily, when the Al$_2$O$_3$ component of the optically translucent body ranges from about 74.5 weight % to about 75.5 weight %, or approaches such range, the sintered body is composed of a single phase of mullite. However, as its Al$_2$O$_3$ content approaches 76 weight %, the optically translucent body is likely to show a minor amount of Al$_2$O$_3$ precipitate as a secondary phase. The presence of the secondary Al$_2$O$_3$ phase is detectable by optical microscopy, X-ray diffraction analysis and by scanning electron microscopy. On the other hand, as the Al$_2$O$_3$ content approaches 74 weight %, the optically translucent body is likely to show glass as a secondary phase. The glassy phase is determinable by optical microscopy after the specimen has been metallographically prepared which includes acid-etching, and by scanning electron microscopy.

The present polycrystalline optically translucent body is of theoretical density, i.e. it has a density of 3.16 g/cc±0.01 or 3.17 g/cc±0.01, or a 100% density based on the density of 3.16 g/cc±0.01 or 3.17 g/cc±0.01 for mullite. The specific density value can vary because it depends on the specific composition of the present mullite product. Such an optically translucent sintered body may have residual small pores but the porosity is not detectable by current liquid displacement density measurements, i.e. it is less than 0.05% by volume of the total volume of the optically translucent body.

The degree of transmission of radiation through the present optically translucent product can also be defined by transmittance, and specifically forward diffuse transmittance, which is the ratio of the intensity of the transmitted beam and the intensity of the incident beam and refers to radiation of certain wave length and a specimen of certain thickness. These variables are related by the formula below, $$I/I_o = ke^{-\alpha d}$$

where $I$ and $I_o$ are the intensities of the transmitted and incident beams, $d$ the thickness of the specimen, $\alpha$ the absorption coefficient and $k$ is a constant determinable from the refractive index of the material. In addition the cone angle of the transmitted beam has to be specified.

The present optically translucent body has an average minimum forward diffuse transmittance of 70% per 0.75 millimeter thickness over the visible wave lengths ranging from 4000 Angstroms to 8000 Angstroms.

The invention is further illustrated by the following examples wherein the procedure was as follows unless otherwise stated:

Calcining was carried out in air at atmospheric pressure.

Surface area measurements were made by a low temperature nitrogen absorption technique.

Sintering was carried out in a molybdenum-wound resistance furnace comprised of a dense open-ended alumina tube with a ¾ inch I.D. or a 2 inch I.D.

Temperature was measured and controlled with a W 5% Re, W 26% Re thermocouple contained in a protective sapphire sheath. Temperature measurement also was performed by sighting directly on the sample with an optical pyrometer.

At the end of each sintering run, the power was switched off and the sintered body was furnace-cooled to room temperature.

The bulk density of the powder as well as each pressing or compact was determined from its weight and dimensions.

Density of the sintered product was determined by water displacement using Archimedes method.

Sintering was carried out at atmospheric pressure in flowing oxygen.

Shrinkage is linear shrinkage ($\Delta L/L_o(\%)$), and it is the difference in length between the unsintered body, i.e. compact, and the sintered body, $\Delta L$, divided by the length of the compact, $L_o$. This shrinkage is an indication of the extent of densification.

Densities were obtained on the as-fired sintered bodies.

Phase composition of the sintered specimens was determined by standard metallographic techniques using optical microscopy.

Forward diffuse transmission measurements on sintered bodies were made using a Perkin Elmer mold 330 spectrophotometer using an integrating sphere of 60 mm diameter. The body was placed reproducibly in the same position each time by butting the body against the aperture. Forward diffuse transmittance herein was determined with a cone angle of the transmitted beam from 120° to 180°.

Forward specular transmission measurements on sintered bodies were also made on the Perkin Elmer 330 spectrophotometer by using a ⅜" aperture and positioning the body in the center of the sample compartment. Forward specular transmittance herein was determined with cone angle around the transmitted beam less than 2°.

The forward scattered transmission was measured on sintered bodies using a HeNe laser having a wavelength of 6328 Å. The detector with rectangular dimensions of 0.56 cm by 0.30 cm was mounted on a horizontal brass rod 0.33 cm in diameter. The brass rod was recessed to accommodate the detector. The sintered body to be measured was placed over the detector and allowed to hang on the rigidly supported brass rod. The forward scattered transmission was defined as the signal with a sample, i.e. sintered body, divided by the signal without a sample, i.e. sintered body.

The total transmission was measured on sintered tubes using an integrating sphere. A light source was placed in the center of the sphere 18 inches in diameter. The light source was a quartz line lamp. Measurements were made with a sample in the sphere over the light source, i.e. the light source was within the sintered tube, in the sphere and with no sample, i.e. sintered tube, in the system. The ratio of the two measurements was defined to be the total transmission.

EXAMPLE 1

At room temperature aluminum secondary butoxide was admixed with ethylsilicate to form a solution of the desired $Al_2O_3/SiO_2$ ratio, and a number of solutions of varied ratio, i.e. 73 wt %–77 wt % $Al_2O_3$/balance $SiO_2$ were thus formed.

Each 600 gram solution was diluted with 1 liter of cyclohexane. A mixture composed of equivalent amounts of water and tertiary butyl alcohol was admixed with each solution in an amount which was calculated to provide sufficient water to completely hydrolyze it forming a dispersion of an insoluble polymeric precipitate of the $Al_2O_3/SiO_2$ ratio.

Each resulting dispersion was stirred overnight at room temperature to insure complete homogeneity and then the precipitate, i.e. gel, was filtered off. The gel was washed three times with cyclohexane to remove its alcohol content. The resulting gel was freeze-dried producing a fluffy free-flowing shapeless powder. This procedure was repeated a number of times producing a number of batches of powder.

The powders were calcined in air at temperatures ranging from 490° C.–1100° C. for firing time periods ranging from 8 hours to 20 hours to remove its water and hydrocarbon content so that no significant amount thereof remained.

The calcined powder was fluffy, free-flowing, shapeless and amorphous to X-ray diffraction analysis. The noncalcined powder, as well as the calcined powder, had a specific surface area ranging from 100 m$^2$/g to 400 m$^2$/g, and typically 400 m$^2$/g, and it had a bulk density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 2

Aluminum monohydrate with an average particle size of 200 Å was dispersed in water to form a colloidal dispersion. Specifically, the concentration was 1 gram of AlO(OH):8 grams of H$_2$O. The dispersion was effected by adding HNO$_3$ to obtain a pH of 3 to 4. The AlO(OH) dispersion was ball milled overnight and removed from the mill. On standing 24 hours or more a small fraction of the AlO(OH) settled from the dispersion and was removed by straining the clear solution.

The AlO(OH) dispersion was analyzed gravimetrically to determine the concentration of Al$_2$O$_3$ exactly. Ethyl silicate (Si(OC$_2$H$_5$)$_4$) was then added to produce a mixture of the desired Al$_2$O$_3$/SiO$_2$ ratio, and a number of mixtures of varying ratio, i.e. 69.9 wt %–79.1 wt % Al$_2$O$_3$/balance SiO$_2$ were thus formed.

Each mixture was vigorously stirred at room temperature for several hours until the ethyl silicate was completely hydrolyzed, and after that each mixture was placed in a high speed mixer and ammonia was added until the dispersion gelled. Typically 3 cc to 6 cc of NH$_4$(OH) were required for each liter of dispersion.

Each resulting gel was frozen and subsequently thawed at room temperature which turned the gel into a filterable dispersion.

The gel particles were filtered off from the solution and washed with anhydrous methanol and acetone in sequence to remove all H$_2$O from the particles prior to drying.

The resulting non-aqueous gel was dried at 200° C. in air producing the present white fluffy flowable starting powder. Usually, this powder was screened thru a 40 mesh sieve to break down or remove any aggregates.

This procedure was repeated a number of times producing a number of batches of powder.

The starting powders were calcined, i.e. fired, in air at temperatures ranging from 490° C.–1100° C. for firing time periods necessary to remove their water and hydrocarbon content so that no significant amount thereof remained.

The calcined powder was fluffy, free-flowing, shapeless and amorphous to X-ray diffraction analysis. The noncalcined powder, as well as the calcined powder, had a specific surface area ranging from 100 m$^2$/g to 400 m$^2$/g, typically 400 m$^2$/g, and a bulk density ranging from about 0.2 g/cc to about 0.3 g/cc.

The calcined powder was pressable in a steel die at room temperature under a pressure of about 50,000 psi into a compact having a minimum density of 1.0 g/cc.

EXAMPLE 3

Three starting aluminosilicate powders were prepared in the same manner disclosed in Example 2. Each powder was calcined at 600° C. in air for 3 hours and then analyzed by wet chemical analysis. Their respective compositions were as follows:

| Specimen | % Al$_2$O$_3$ by weight | % SiO$_2$ by weight |
|---|---|---|
| A | 72.3 | 27.7 |
| B | 75.0 | 25.0 |
| C | 79.1 | 20.9 |

Impurities determined by emission spectroscopy of each powder were in %, 0.02 Na, 0.01 Fe, <0.004 Ca, 0.07 Ti.

Each powder was pressed in a steel die at room temperature under a pressure of 75,000 psi into a disc one inch in diameter and a thickness of about 0.04 inch. Each disc had a green density of about 1.3 g/cc.

The discs were heated in oxygen to a sintering temperature of 1800° C. and held at 1800° C. in oxygen for 3 hours. The heating rate was 300° C./hr. All of the sintered discs, i.e. specimens, were analyzed for alumina and silica content by X-ray fluorescence. No change in composition was detected due to the sintering exposure within the accuracy of the technique that was ±0.2% of each silica and alumina.

Sintered specimen A was a white, porcelain-like disc. Its density was 3.11 g/cc and its translucency was too small to be measured quantitatively on a photometer even after grinding to 0.030 inch thickness and polishing its surfaces. A metallographic study revealed the presence of large elongated mullite crystals of rectangular cross section up to 100 micrometers long and about 6% by volume of another phase, high in silica and amorphous as determined by electron diffraction. This phase was a glass distributed randomly in 2 to 8 micron pockets among the grains of mullite. No pores were observed microscopically in a thin section and the opacity of the body was therefore attributed to light scattering due to the second phase.

Sintered disc B illustrates the present invention. It was approximately 0.75 inch in diameter, 0.030 inch in thickness and had a density of 3.155 g/cc. In its as-sintered, non-polished condition, it was optically translucent and would be useful as an enclosure for an arc tube. When it was laid against newspaper print, the print could be read by eye. Its optical translucency also indicated that it was theoretically dense and that it was composed of single phase mullite.

Figure 3:
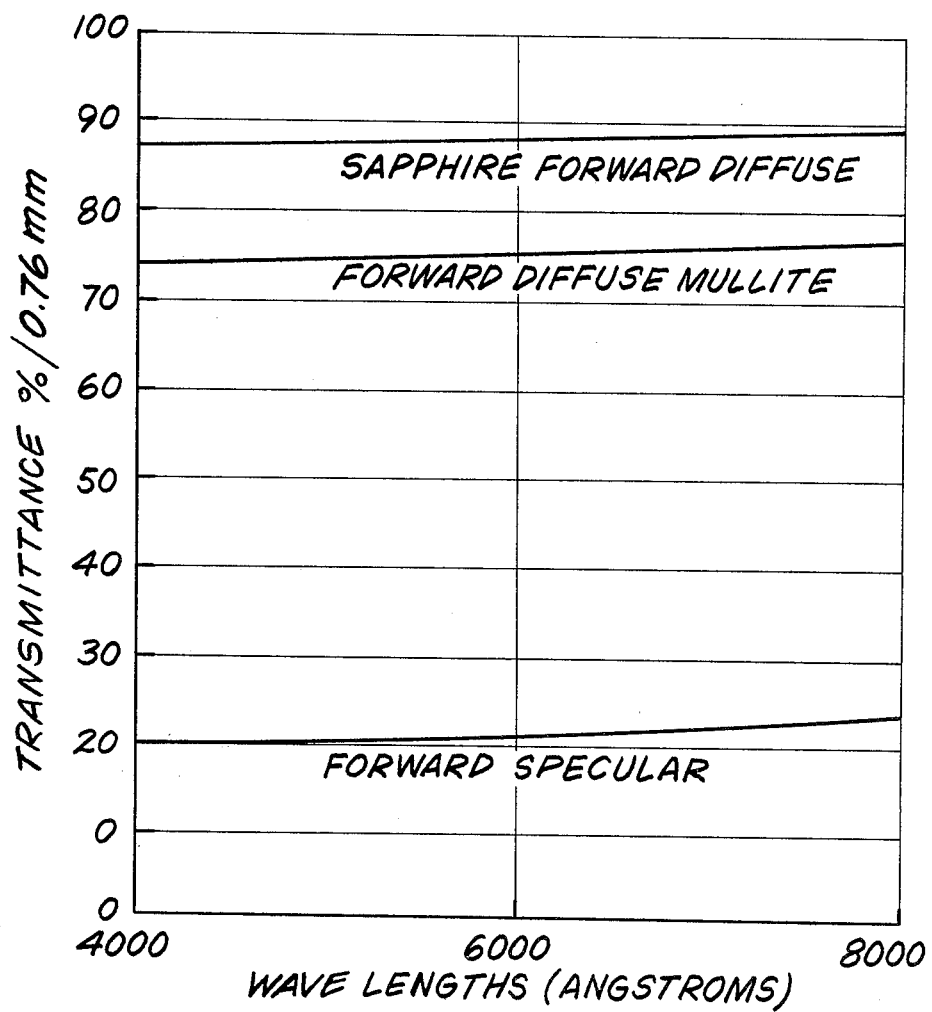
FIG. 3 shows graphs illustrating the optical translucency of the present product in the visible wave length range from blue to red.

The disc was ground and polished on both sides to a thickness of 0.030" (0.76 mm). An optical transmittance scan of the visible region of the electromagnetic spectrum of this polished disc was made and is shown in FIG. 3. Specifically, FIG. 3 shows a forward diffuse transmittance ranging from about 74% to about 77% in the visible spectrum ranging from 4000 Å to 8000 Å. FIG. 3 also shows the forward specular transmittance of polished disc B to be 23%.

As a control, FIG. 3 also shows the forward diffuse, transmittance obtained with sapphire of 0.76 mm thickness.

A thin cross section of polished sintered disc B was polished, and examined and found to be composed of a single phase of mulllite. No second phase was observed and only a few intergranular pores, 2 microns or less, were present. The total pore volume was estimated at less than 0.01%.

Figure 2:
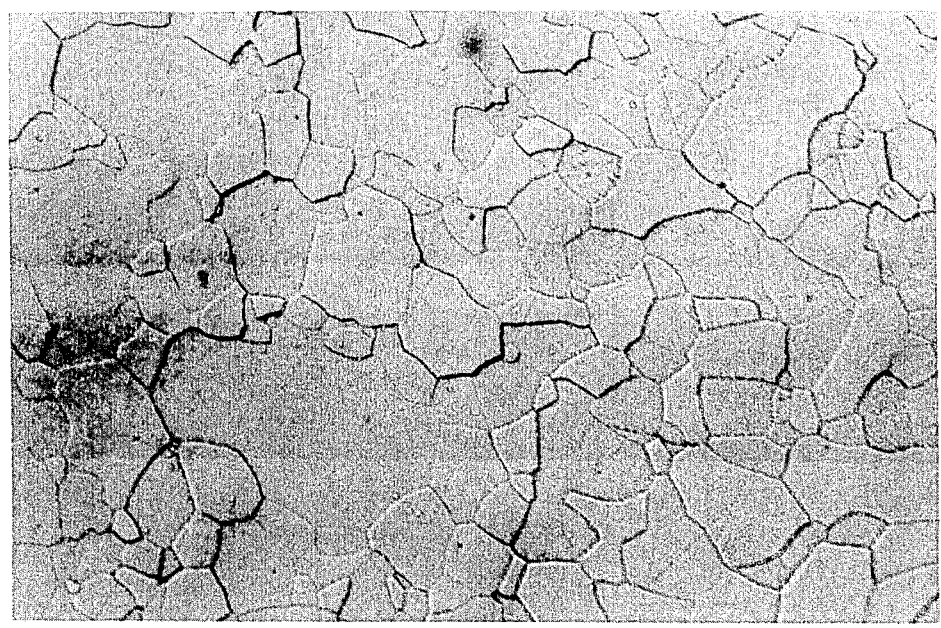
FIG. 2 is a photomicrograph (magnified 750×) of a portion of FIG. 1.

Sintered disc B was polished and etched with boiling concentrated sodium hydroxide, rinsed with water and dried to reveal its grain structure. An etched section is shown in FIGS. 1 and 2. FIGS. 1 and 2 show a uniform microstructure and substantially regular equiaxed grains which had an average grain size of 15 microns as measured by mean linear intercept.

Specimen C was only slightly translucent. It was composed of equiaxed grains of mullite 15μ and small grains of $\alpha$-$Al_2O_3$ about 1-2 μm in size that were distributed both intergranularly and intragrannularly in the mullite matrix. The second phase was identified by an electron microprobe.

EXAMPLE 4

The starting aluminosilicate powder used in this example was prepared in the same manner disclosed in Example 2 and it was comprised of 75 wt % $Al_2O_3$/25 wt % $SiO_2$. The powder was calcined in air at 500° C. for 8 hours to remove its water and hydrocarbon content.

The calcined powder was pressed into a hollow tube utilizing a conventional wet bag isostatic pressing technique. Specifically, the powder was initially loaded around a polished tungsten mandrel within a deformable bag, which was then sealed and submerged in oil and pressed at room temperature under a pressure of 50,000 psi. The pressed tube was recovered and it had an ID of 0.625", a length of 4.0" and a wall thickness of 0.03".

The tube was heated in oxygen to a sintering temperature of 1800° C. where it was held for 3 hours. Measurement of the sintered tube showed that it had shrank 27%. The sintered tube had a wall thickness of 0.020".

The tube was optically translucent. It had a substantially uniform microstructure comprised of substantially equiaxed grains with an average grain size of about 15 microns. Its optical translucency indicated that it was 100% dense. It appeared to be composed of a single phase of mullite.

The optical properties of the unpolished tube were found to be as follows:

| | |
|---|---|
| Total transmission | 90.4% |
| Forward scattered transmission | 78% |
| Index matching oil on surface transmission | 81% |

The index matching oil on surface transmission was carried out in the same manner as the forward scattered transmission except that there was an index matching oil placed on the surface of the sintered tube which reduced scattering caused by surface roughness.

The tube would be useful as an enclosure for an arc tube.

All of the starting powders of the examples in Table I were prepared in substantially the same manner as disclosed in Example 2. All of the starting powders were fluffy, shapeless and free-flowing.

The powders were calcined in air as given in Table I. All of the calcined powders were white, fluffy, shapeless and free-flowing except the calcined powders of Examples 29-35 which were tan in color from undecomposed hydrocarbons.

Each calcined powder of Examples 5-40 was pressed in a steel die under the given pressure at room temperature into the form of a disc. The green pressed discs of Examples 5-16 and 29-40 were one inch in diameter whereas the green pressed discs of Examples 17-28 were ½ inch as diameter. All of the green pressed discs had a thickness of about 0.04 inch.

Each calcined powder of Examples 41 and 42 was pressed into a hollow tube in substantially the same manner disclosed in Example 4. The pressed tube in Examples 41 and 42 had an ID of 0.625" and a length of 4".

The green pressed discs of Examples 5-28 and Examples 36-40 were slightly translucent. The hollow green pressed tubes of Examples 41 and 42 also were slightly translucent. The pressed green discs of Examples 29-35 were brown in color from undecomposed hydrocarbons.

In all of the examples of Table I, except Examples 39 and 42, the green discs and tubes were heated in oxygen to the given sintering temperature and held at sintering temperature in oxygen three hours. Example 42 was heated in oxygen to the given sintering temperature where it was held for 12 hours. The pressed disc of Example 39 was prefired in a vacuum of about 0.05 torr at 1600° C. where it was held for 3 hours, then furnace-cooled and then heated in oxygen to the given sintering temperature where it was held for 3 hours.

In Table I, all of the discs and tubes were heated in oxygen to sintering temperature at a rate of about 300° C. or less per hour, and specifically, the discs of Examples 29-35 were heated at a rate of 50° C./hr to remove undecomposed hydrocarbons therefrom before the pores of the discs closed.

TABLE I

| Ex. No. | Starting Powder Composition Al$_2$O$_3$ (wt %) | Starting Powder Composition SiO$_2$ (wt %) | Calcining of Powder Temp (°C.) | Calcining of Powder Time (hrs) | Powder Pressing Pressure (psi) | Green Pressed Body Density (g/cc) | Sintering Temp (°C.) | Sintered Body Density (g/cc) | Sintered Body Linear Shrinkage (%) | Sintered Body |
|---|---|---|---|---|---|---|---|---|---|---|
| 5 | 69.0 | 31.0 | 490 | 10 | 100,000 | 1.4 | 1760 | 2.93 | — | Opaque. Non-equiaxed grains and second phase of glass present. |
| 6 | " | " | 800 | 8 | " | 1.5 | 1810 | — | 19.3 | |
| 7 | 69.6 | 30.4 | 490 | 10 | " | 1.4 | 1760 | 3.13 | — | |
| 8 | " | " | 800 | 8 | " | 1.5 | 1810 | — | 20.9 | |
| 9 | 70.1 | 29.9 | 490 | 10 | " | 1.3 | 1760 | 3.13 | — | |
| 10 | " | " | 800 | 8 | " | 1.4 | 1810 | — | 20.9 | |
| 11 | 70.7 | 29.3 | 490 | 10 | " | 1.3 | 1760 | — | — | |
| 12 | " | " | 800 | 8 | " | 1.5 | 1810 | 3.11 | 19.5 | |
| 13 | 71.3 | 28.7 | 490 | 10 | " | 1.3 | 1760 | 3.12 | — | |
| 14 | " | " | 800 | 8 | " | 1.5 | 1810 | 3.11 | 20.1 | |
| 15 | 72.0 | 28.0 | 490 | 10 | " | 1.3 | 1760 | 3.12 | — | |
| 16 | " | " | " | " | " | 1.5 | 1810 | — | 19.4 | |
| 17 | 73.5 | 26.5 | 600 | 72 | 75,000 | 1.2 | 1600 | 3.11 | — | Slightly translucent like china |
| 18 | 73.5 | 26.5 | " | " | " | " | 1800 | 3.17 | — | Slightly translucent like china |
| 19 | 74.0 | 26.0 | " | " | " | " | 1620 | 3.10 | 23.6 | Slightly translucent like china |
| 20 | 74.0 | 26.0 | " | " | " | " | 1800 | 3.16 | — | Optically translucent by eye to print. |
| 21 | 74.5 | 25.5 | " | " | " | " | 1620 | 3.11 | 23.6 | Slightly translucent like china |
| 22 | 74.5 | 25.5 | " | " | " | " | 1800 | 3.16 | — | Optically translucent by eye to print. |
| 23 | 75.0 | 25.0 | " | " | " | " | 1620 | 3.10 | 23.7 | Slightly translucent like china |
| 24 | 75.0 | 25.0 | " | " | " | " | 1800 | 3.155 | — | Optically translucent by eye to print. |
| 25 | 75.5 | 24.5 | " | " | " | " | 1620 | 3.10 | 23.7 | Slightly translucent like china |
| 26 | 75.5 | 24.5 | " | " | " | " | 1800 | 3.155 | — | Optically translucent by eye to print. |
| 27 | 76.0 | 24.0 | " | " | " | " | 1620 | 3.11 | 23.9 | Slightly translucent like china |
| 28 | " | " | " | " | " | " | 1800 | 3.15 | — | Optically translucent by eye to print. |
| 29 | " | " | 500 | 8 | 25,000 | 0.88 | 1840 | 3.13 | 34.0 | Slightly translucent like china |
| 30 | " | " | " | " | 40,000 | 1.00 | " | 3.16 | 31.1 | Optically translucent by eye to print. |
| 31 | " | " | " | " | 50,000 | 1.15 | " | " | 28.0 | Optically translucent by eye to print. |
| 32 | " | " | " | " | 60,000 | 1.18 | " | " | 26.3 | Optically translucent by eye to print. |
| 33 | " | " | " | " | 75,000 | 1.23 | " | " | 24.8 | Optically translucent by eye to print. |
| 34 | " | " | " | " | 100,000 | 1.35 | " | " | 22.3 | Optically translucent by eye to print. |
| 35 | " | " | " | " | " | " | " | " | — | Optically translucent by eye to print. |
| 36 | 75.0 | 25.0 | " | " | 75,000 | — | 1600 | — | — | Slightly translucent like china |
| 37 | " | " | " | " | " | — | 1730 | — | — | Translucency between samples of Ex. 36 & 38 |
| 38 | " | " | " | " | " | — | 1800 | — | — | Optically translucent by eye to print. |
| 39 | 73.0 | 27.0 | 650 | 16 | 100,000 | — | 1700 | — | — | Not sufficiently translucent to be useful |
| 40 | 75.0 | 25.0 | 750 | 8 | " | — | 1850 | — | — | Optically translucent by eye to print. |
| 41 | 75.0 | " | 500 | " | 50,000 | — | 1800 | — | — | Optically translucent |
| 42 | 76.0 | 24.0 | " | " | " | — | 1850 | — | — | Optically translucent |

Table I characterizes the sintered bodies in their as-sintered, unpolished condition.

In Table I, by optically translucent by eye to printed page, it is meant that when the as-sintered unpolished disc was laid against print, such as newspaper print, such print could be read by eye.

Examples 20, 22, 24, 26, 28, 30-35, 38, and 40-42 illustrate the present invention since all of these examples produced products which were optically translucent and which would be useful as enclosures for arc tubes. Specifically, the sintered bodies of Examples 20, 22, 24, 26, 28 and 30-35 were 100% dense as shown by their measured density values as well as by their optical translucency.

The sintered bodies of Examples 38 and 40-42 also were 100% dense, i.e. theoretically dense, as indicated by their optical translucency.

All of the sintered bodies of Examples 22, 24, 26, 28, 30-35, 38 and 40-42 had a uniform or substantially uniform microstructure which was comprised of equiaxed or substantially equiaxed grains, and all of these sintered materials would be useful as enclosures for arc tubes.

Figure 4:
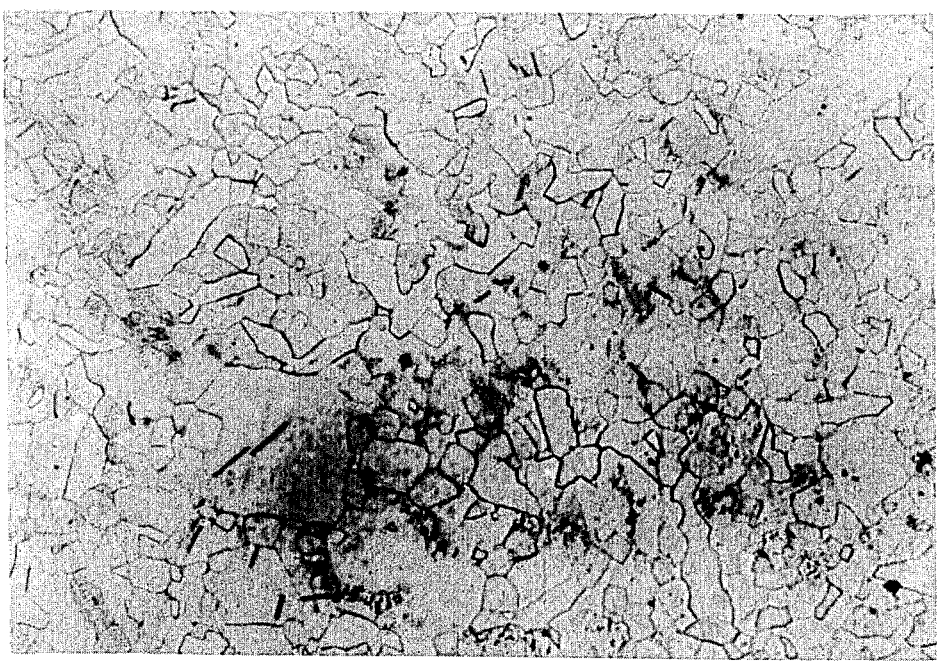
FIG. 4 is a photomicrograph (magnified 750×) showing the polished and etched section of an optically translucent disc of 74 wt % $Al_2O_3$/balance $SiO_2$ produced in accordance with the present invention at a sintering temperature of 1800° C.

A polished and etched section of the sintered disc of Example 20 is shown in FIG. 4 and illustrates the elongated grain structure produced with a disc of 74 weight % Al$_2$O$_3$ 26 weight % SiO$_2$ sintered at 1800° C. The sintered material of Example 20 also would be useful as an enclosure for an arc tube.

A face of the sintered disc of Examples 36-38 was ground and polished, and etched with boiling NaOH, washed with water, dried and its average grain size was determined by mean linear intercept. The average grain size of the disc of Example 36 was 3 microns, for Example 37 it was 7.4 microns and for Example 38 it was 16.5 microns. The microstructure of each of these polished discs was uniform and it was composed of equiaxed grains. A short segment of the tube of Example 42 was cut off and a cross-section was ground, polished and etched and its average grain size determined by mean linear intercept was 42 microns.

In Example 40, the disc was ground and polished on both sides to a thickness of 0.030" (0.76 mm) and its forward scattered transmission was measured at 4880 Å using an argon laser and found to be 75%. For reference, the forward scattered transmission of sapphire of the same thickness was measured in the same manner and found to be 77%.

In Examples 41 and 42, each as-sintered unpolished tube had a wall thickness of 0.030". In Example 41 the unpolished as-sintered tube had a forward scattered transmission of 65%, a total transmission of 83.4%, and an index matching oil on surface transmission (as defined and disclosed in Example 4) of 69%. In Example 42, the unpolished sintered tube had a total transmission of 94%, whereas the polished tube had a forward scattered transmission of 59%.

The sintered bodies of Examples 20, 22, 24, 26, 38, 40 and 41 appeared to be composed of a single phase of mullite.

The sintered bodies of Examples 28, 30–35 and 42, which contained 76.0 weight % $Al_2O_3$, showed a minor amount, less than 1% by volume of a secondary phase of $Al_2O_3$. This secondary phase of $Al_2O_3$ did not prevent these sintered products from being optically translucent.

The sintered products of Examples 5–18 had compositions outside those of the present invention, and they were opaque or not optically translucent.

The sintered product of Example 39 had a composition outside that of the present invention and had been prefired in a vacuum which was too high and it was not optically translucent.

The sintering temperatures of Examples 21, 23, 25, 27 and 36 were too low to produce the present product.

In Example 29, the density of the pressed body was below 1.0 g/cc and prevented the production of an optically translucent product.

In Example 37, for this particular compact, a higher sintering temperature would have produced an optical translucent product as illustrated by Example 38.

As used herein, transmission and transmittance are equivalent.

The following copending U.S. patent applications are assigned to the assignee hereof and are incorporated herein by reference and contain claims to the same product herein or cover the product herein:

Ser. No. 381,820 filed of even date herewith in the names of S. Prochazka and F. J. Klug entitled "OPTICALLY TRANSLUCENT CERAMIC" discloses pressing amorphous mixed oxide powder composed of from about 74 weight % to about 76.5 weight % $Al_2O_3$ balance $SiO_2$ into a compact with a density of at least 1 g/cc, firing the pressed compact in oxygen or a vacuum of 0.05 torr to 1 torr to produce a compact impermeable to gas, and sintering the resulting fired body in air, argon, helium, nitrogen, or mixtures thereof producing an optically translucent theoretically dense body of mullite.

Ser. No. 381,822 filed of even date herewith in the names of S. Prochazka and F. J. Klug entitled "OPTICALLY TRANSLUCENT CERAMIC" discloses optically translucent dense bodies by pressing amorphous mixed oxide powder composed of from about 72.5 weight % to about 76.5 weight % $Al_2O_3$ balance $SiO_2$ into a compact with a density of at least 1 g/cc, sintering the pressed compact in oxygen or a vacuum of 0.05 torr to 1 torr to produce a compact impermeable to gas, hot isostatically pressing the sintered compact with a gas under superatmosphere pressure at elevated temperature to theoretical density, and with respect to compositions ranging from higher than about 74 wt % $Al_2O_3$/balance $SiO_2$, annealing the theoretically dense body.

What is claimed is:

1. A process for producing a polycrystalline mullite body optically translucent in the visible wave length which comprises providing an amorphous shapeless mixed oxide powder consisting essentially of from about 74 weight % to about 76.5 weight % $Al_2O_3$ balance $SiO_2$ with a surface area ranging from about 100 square meters per gram to about 400 square meters per gram and a bulk density ranging from about 0.2 g/cc to about 0.3 g/cc containing a significant amount of water, calcining said powder at a temperature ranging from about 490° C. to about 1100° C. to remove water and any organic material therefrom leaving no significant amount thereof producing an amorphous shapeless mixed oxide powder consisting essentially of from about 74 weight % to about 76.5 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, and sintering said compact in an atmosphere of oxygen at a temperature ranging from about 1700° C. to about 1850° C. producing a sintered body of theoretical density based on the density of 3.16 g/cc±0.01 or 3.17 g/cc±0.01 for said mullite body.

2. A process according to claim 1 wherein said compact is prefired in oxygen or in a vacuum ranging from about 0.05 torr to about 1.0 torr at a temperature ranging up to about 1650° C.

3. A process to claim 1 wherein said $Al_2O_3$ ranges from about 74.5 weight % to about 75.5 weight %.

4. A process according to claim 1 wherein said compact is prefired to impart strength thereto in air, argon, helium, nitrogen, oxygen and mixtures thereof as well as a partial vacuum at a temperature ranging up to about 1500° C., said prefiring having no significant deleterious effect on said compact.

5. A process for producing a polycrystalline mullite body optically translucent in the visible wave length which comprises providing an amorphous shapeless mixed oxide powder consisting esssentially of from about 74.5 weight % to about 75.5 weight % $Al_2O_3$ balance $SiO_2$ with a surface area ranging from about 200 square meters per gram to about 300 square meters per gram and a bulk density ranging from about 0.2 g/cc to about 0.3 g/cc containing a significant amount of water, calcining said powder at a temperature ranging from about 500° C. to 700° C. to remove water and any organic material therefrom producing an amorphous shapeless mixed oxide powder consisting essentially of from about 74.5 weight % to about 75.5 weight % $Al_2O_3$ balance $SiO_2$, said calcining having no significant effect on the oxide composition or morphology of said powder, said calcined powder being pressable at about room temperature into a compact having a minimum density of 1.0 g/cc, pressing said calcined powder into a compact having a minimum density of 1.0 g/cc, and sintering said compact in an atmosphere of oxygen at a temperature ranging from about 1700° C. to about 1850° C. producing a sintered body of theoretical density based on the density of 3.16 g/cc±0.01 or 3.17 g/cc±0.01 for said mullite body.

* * * * *